Patented May 5, 1953

2,637,751

UNITED STATES PATENT OFFICE 2,637,751

ADHESIVE COMPOSITIONS FROM MIXTURES OF CHLORINATED AND HYPOCHLORINATED RUBBER

Lester A. Brooks, Norwalk, Conn., assignor to R. T. Vanderbilt Company, Inc., New York, N. Y., a corporation of New York No Drawing. Application November 21, 1951, Serial No. 257,664

3 Claims. (Cl. 260—727)

My invention relates to a composition of matter which is useful in the uniting of rubber to metallic surfaces, and my invention also relates to a method for the preparation of such composition.

Various methods are known for uniting rubber to metallic surfaces. For example, one of the known methods involves coating the metal surface with brass plating, applying a coating of rubber cement to the brass plating, and then vulcanizing the rubber while the rubber is in contact with the cement coating. This method has not proved to be entirely satisfactory, however, because it involves a brass plating operation. Another known method involves the coating of the metallic surface with an adhesive composition containing a cement of resin-like or cyclycized rubber derivatives, and vulcanizing the rubber layer to the cement layer with an intermediate layer of tie-gum rubber. This method, too, has not proved to be entirely satisfactory since the coating of the brittle rubber derivative is weaker than the adhered rubber compound, so that the rubber to metal bond is not sufficiently strong to resist conditions of shock or impact. Various other methods possess serious drawbacks, such as limitations or the types of rubber, particularly natural rubber and the synthetic rubbers known as GR-S and neoprene, which can be properly adhered.

In accordance with my invention, I have been able to provide a new composition of matter which can be suitably used for the purpose of uniting rubber to metallic surfaces and which does not suffer from the deficiencies just noted when used. Moreover, the new composition of matter which I have prepared can be conveniently manufactured upon a commercial scale, since it involves the use of chemical compositions which are stable. This composition contains chlorinated rubber, hypochlorinated natural rubber, suitable organic solvents and one or more of a variety of compounds which are useful as rubber antioxidants.

Example

As an illustration of the preparation of specific compositions which fall within the scope of my invention, 10.5 pounds of pale crepe rubber was milled until it gave a reading of 20 when tested on a Mooney viscosimeter after which the rubber was dissolved in 200 pounds of 10° xylol. The solution of the rubber in the xylol was prepared by stirring for a period of approximately 12 hours. After this was done, the viscosity of the xylol solution was about 49 centipoises at about 25° C.

In a separate container a solution of sodium hypochlorite was prepared. Thus, 60 pounds of ice was added to 13 pounds of 50% aqueous caustic soda. With stirring, 5 pounds of chlorine was bubbled in, the temperature at all times during the addition of chlorine remaining at 5° C. or below. At the end of the addition of the chlorine and after most of the ice had melted, the cold solution was stirred for 15 minutes and was analyzed in order to determine its content of sodium hypochlorite. The analysis showed that the sodium hypochlorite solution contained 73.3 grams of sodium hypochlorite per liter.

29.2 liters of this solution was taken and diluted with 15 pounds of ice and 45 pounds of water. Then, after the ice had melted, 10% of the entire volume was added to the solution of rubber in xylol prepared as previously described and the entire mixture was stirred, forming an emulsion. Initially, the viscosity of the emulsion was about 49 centipoises at a temperature of about 25° C., and after the mixture had been stirred for about 40 minutes the viscosity of the emulsion was 14 centipoises under the same temperature conditions.

The remainder of the aqueous solution of sodium hypochlorite was acidified using 5 pounds of glacial acetic acid mixed with 10 pounds of ice. The hypochlorous acid solution thus formed was rapidly added, with stirring, to the emulsion containing the rubber which had been reacted with the sodium hypochlorite.

After stirring for 40 minutes, 200 grams of an oxidation inhibitor, di-beta-naphthyl-para-phenylene-diamine, was added and then 100 pounds of calcium chloride dihydrate was added, following which the entire mixture was stirred for an additional 40 minutes, at which time the calcium chloride dihydrate had dissolved. After standing overnight, the emulsion broke, and the top layer containing the solution of the treated rubber in xylol was decanted. This layer analyzed 5.3% by weight of solids and had a viscosity of about 6 centipoises at about 25° C. Also, the aforementioned solids contained 16.5% by weight of chlorine.

One specific composition falling within the scope of the present invention was prepared as follows:

81 parts by weight of the xylol solution containing the treated rubber and the antioxidant was admixed with 40 parts by weight of 10° xylol after which 32 parts by weight of 20 centipoise chlorinated rubber containing about 67% by weight of chlorine was added. To the mixture was then added 9 grams of a dye, Sudan Corinth 3B. Finally, 26 parts by weight of carbon tetrachloride was added to provide a finished product which had a viscosity of about 55 centipoises at 25° C.

In order to provide a second specific composition falling within the scope of my invention, the procedure of the preceding example was repeated, with the exception that the 32 grams of chlorinated rubber used were replaced by 26 grams of the same chlorinated rubber and 6 grams of 125 centipoise chlorinated rubber having a chlorine content of about 67% by weight. Thus, in preparing the composition described in this paragraph and in preparing the composition described in the preceding paragraph, 32 grams of chlorinated rubber were used. The final composition prepared as described in this paragraph had a viscosity of about 120 centipoises at about 25° C.

Further, in order to provide a third composition falling within the scope of my invention, the procedure of the second preceding paragraph was repeated, with the exception that instead of using 32 grams of the 20 centipoise chlorinated rubber there was used 26 grams of the 20 centipoise chlorinated rubber, 5 grams of the 125 centipoise chlorinated rubber described in the preceding paragraph and 1 gram of a 1000 centipoise chlorinated rubber having a chlorine content of about 67% by weight. The final composition prepared as described in this paragraph had a viscosity of about 120 centipoises at about 25° C.

Various modifications can be made in the specific procedure set forth above to provide other compositions which fall within the scope of my invention. Thus, although I prefer to use crepe rubber for reaction with the sodium hypochlorite and the hypochlorous acid, other grades of natural rubber, such as smoked sheet, can also be used. In general, the Mooney reading after the rubber has been broken down should be within the range from about 17 to 23, although rubbers with somewhat lower and somewhat higher Mooney readings can also be used. After the rubber has been broken down, it is then made into my adhesive composition as promptly as possible, since if this is not done the rubber will gradually stiffen up and its Mooney reading will increase.

Furthermore, solvents such as benzene, toluene and the pure xylenes can be used in place of the xylol in which the crepe rubber was dissolved, but of course it also is possible to use mixtures of any of the aforementioned solvents. In the specific example, the xylol solution prepared contained 5% by weight of the crepe rubber. The concentration of the rubber in the solvent can be both higher and lower than this. In general, however, the natural rubber solution prepared should contain at least about 3.5% by weight of rubber and not more than about 10 or 15% by weight, in order that the time consumed and the amount of treated rubber lost in breaking the emulsion at a subsequent stage in the operation will not be too great. The viscosity of the solution of rubber in the solvent should be within the range from about 45 to about 60 centipoises at 25° C.

The aqueous solution of sodium hypochlorite is prepared in the conventional manner by bubbling a weighed amount of chlorine into an ice cold solution of 10% by weight aqueous caustic soda. To obtain the best results, certain precautions should be observed here, such as elimination of possible contamination of the sodium hypochlorite solution with heavy metals, for example, iron and copper, which have an extremely deleterious effect upon the final product. Upon preparation of the aqueous solution of sodium hypochlorite, the solution is analyzed and should contain from about 65 to about 90 grams of sodium hypochlorite per liter, as determined by standard methods of analysis. This solution is then diluted with approximately an equal weight of water. In commercial operations a portion of the diluted solution is used for reaction with the rubber and the remainder is converted into hypochlorous acid containing from about 25 to about 32 grams per liter of hypochlorous acid. The relative amounts of the solution containing the rubber and the solution of sodium hypochlorite used can be varied to some extent, the specific example setting forth desirable amounts. However, after the reaction between the rubber and the sodium hypochlorite has been performed, the emulsion should have a viscosity within the range from about 12 to about 25 centipoises at 25° C.

The next step in the process involves treating with hypochlorous acid the rubber which has already been treated with sodium hypochlorite. As has been stated, in preparing my composition upon a commercial scale I prefer to prepare the aqueous solution of hypochlorous acid by acidifying an aqueous solution of sodium hypochlorite. I have found that this acidification should be performed using acetic acid, since when acetic acid is used the acidification is complete within a very short period of time, usually less than a minute, and also since decomposition loss is negligible when this particular acid is used. In reacting the hypochlorous acid with the rubber which has already been treated with sodium hypochlorite, here again the relative amount of hypochlorous acid and sodium hypochlorite-treated rubber present in the reaction mixture are not critical. The cold, dilute hypochlorous acid solution is added rapidly to the mixture containing the rubber which has been treated with the sodium hypochlorite, and the entire mixture is then stirred for a period of 30 or 40 minutes in order to insure complete reaction. I have found, however, that a ten minute stirring time is usually sufficient for the rubber to completely absorb all the hypochlorous acid. At the completion of this reaction, the rubber should contain from about 5 to 25% by weight of chlorine. However, where my composition is to be used for the bonding of neoprene, the rubber at the completion of this reaction should preferably contain from about 15 to 17% by weight of chlorine.

In preparing my composition upon a commercial scale, in order to produce from the natural rubber a rubber containing from about 5 to about 25% by weight of chlorine and to produce the emulsion containing the chlorinated rubber and meeting the viscosity requirement of from about 5 to about 15 centipoises, it is advisable first to subject the milled and dissolved rubber to the action of sodium hypochlorite and then to the action of hypochlorous acid. I have found that it is possible, however, to produce compositions which fall within the scope of my invention by treatment of the rubber with hypochlorous acid alone, the step of treating with sodium hypochlorite initially being omitted.

Any of the conventional rubber antioxidants can be used in place of the particular one described in the specific example. Thus, among the antioxidants which can also be used are aldol-alpha-napthylamine, polymerized trimethyldihydroquinoline, hydroquinone monobenzyl ether, 2.5 di-tert. butyl p-cresol, p-phenyl phenol, alkylated polyhydroxy phenols, alkylated phenol sulfide, di-tert butyl hydroquinone, phenyl alpha naphthylamine, phenyl beta naphthylamine, and so forth. The particular antioxidant and the particular amount thereof used are not critical. They must be present in the composition in amounts sufficient to provide the desired stability over a relatively long period of time.

For the purpose of breaking the emulsion formed in the process, I prefer to use calcium chloride dihydrate as the specific example illustrates. Less preferably, I can use anhydrous calcium chloride or a mixture of anhydrous calcium chloride and the dihydrate.

In the specific example, a further portion of xylol and a portion of carbon tetrachloride were added to the xylol layer. Whether or not xylol or one of the equivalents thereof mentioned above is added at this point depends in part upon the concentration of the xylol or equivalent present in the original milled rubber solution reacted with the sodium hypochlorite or hypochlorous acid. The carbon tetrachloride is added to the composition in order to raise the flash point of the composition. In general the final composition should contain xylol or an equivalent and carbon tetrachloride in such amounts that the composition has a viscosity within the range from about 50 to about 130 centipoises, and preferably from about 110 to about 125, at a temperature of about 25° C.

Any of the usual, commercial available chlorinated rubbers can be employed in preparing my composition. Such rubbers are conventionally manufactured by dissolving milled crepe rubber in carbon tetrachloride and chlorinating the rubber to provide a product containing about 65 to 67% by weight of chlorine. As the art is aware, chlorinated rubber is available in a variety of viscosity grades, depending upon the extent to which the rubber is milled. Usually my composition should contain chlorinated rubber in such amount that the weight of hpyochlorinated rubber is within the range from about 10.4 to about 14.2%, based upon the weight of the hypochlorinated rubber and the chlorinated rubber.

In use, my composition is employed as a coating composition. Thus, the metallic object to be coated is first cleaned particularly of grease, after which the present composition is applied to the metallic object in the form of a thin film, for example, by brushing, by dipping or by spraying. After the solvents present in my composition have evaporated, it usually requiring one half or one hour to provide a dry, non-tacky film, the rubber composition to be bonded to the metallic surface is then applied and vulcanization caused to take place. In order that those using my composition will be able more readily to see to what extent it has been applied to the metallic surface, I provide a dye in the composition.

Where Mooney readings are referred to, such readings signify readings taken using the large rotor and operating the viscosimeter at 230° F. for twelve minutes.

I claim:

1. A composition of matter which is useful in the uniting of rubber to metallic surfaces, the said composition consisting essentially of an admixture of at least one compound useful as a rubber antioxidant, chlorinated rubber having a chlorine content of about 65 to 67 per cent by weight, carbon tetrachloride, a solvent phase prepared by milling a natural rubber until the rubber is characterized by a reading within the range from about 17 to about 23 when tested on a Mooney viscosimeter using the large rotor and taking the reading at 12 minutes when operating the viscosimeter at 230° F., dissolving the milled rubber in at least one solvent selected from the group consisting of benzene, toluene and the xylenes to form a solution containing from about 3.5 to about 15 per cent by weight of the rubber, reacting such solution with an aqueous solution of hypochlorous acid containing from about 25 to 32 grams per liter of hypochlorous acid to provide an emulsion in which the solids present therein have a chlorine content within the range from about 15 to about 17 per cent by weight, breaking said emulsion by the addition thereto of at least one salt selected from the group consisting of anhydrous calcium chloride and calcium chloride dihydrate and separating the phases formed upon the breaking of said emulsion, and sufficient amount of said solvent as is required to form a final composition having a viscosity of from about 50 to about 130 centipoises at 25° C. and containing hypochlorinated rubber within the range from about 10.4 to about 14.2 per cent, based upon the weight of the hypochlorinated rubber and the chlorinated rubber.

2. A composition of matter which is useful in the uniting of rubber to metallic surfaces, the said composition consisting essentially of an admixture of at least one compound useful as a rubber antioxidant, chlorinated rubber having a chlorine content of about 65 to 67 per cent by weight, carbon tetrachloride, a solvent phase prepared by milling crepe rubber until the rubber is characterized by a reading within the range from about 17 to about 23 when tested on a Mooney viscosimeter using the large rotor and taking the reading at 12 minutes when operating the viscosimeter at 230° F., dissolving the milled rubber in xylol to form a solution containing about 5 per cent by weight of the rubber, reacting such solution with an aqueous solution of hypochlorous acid containing from about 25 to about 32 grams per liter of hypochlorous acid to provide an emulsion in which the solids present therein have a chlorine content within the range from about 15 to about 17 per cent by weight, breaking said emulsion by the addition thereto of calcium chloride dihydrate and separating the phases formed upon the breaking of said emulsion, and such amount of xylol as is required to form a final composition having a viscosity of from about 110 to about 125 centipoises at 25° C. and containing hypochlorinated rubber within the range from about 10.4 to about 14.2 per cent, based upon the weight of the hypochlorinated rubber and the chlorinated rubber.

3. A composition of matter which is useful in the uniting of rubber to metallic surfaces, the said composition consisting essentially of an admixture of at least one compound useful as a rubber antioxidant, chlorinated rubber having a chlorine content of about 65 to 67 per cent by weight, carbon tetrachloride, a solvent phase prepared by milling a natural rubber until the rubber is characterized by a reading within the range from about 17 to about 23 when tested on a Mooney viscosimeter using the large rotor and taking the reading at 12 minutes when operating the viscosimeter at 230° F., dissolving the milled rubber in at least one solvent selected from the group consisting of benzene, toluene and xylenes to form a solution containing from about 3.5 to about 15 per cent by weight of the rubber; reacting such solution with an aqueous solution of hypochlorous acid containing from about 25 to about 32 grams per liter of hypochlorous acid to provide an emulsion in which the solids present therein have a chlorine content within the range from about 5 to about 25 per cent by weight, breaking said emulsion by the addition thereto of at least one salt selected from the group consisting of anhydrous calcium chloride and calcium chloride dihydrate and separating the phases formed upon the breaking of said emulsion, and such amount of said solvent as is required to form a final composition having a viscosity of from about 50 to about 130 centipoises at 25° C. and containing hypochlorinated rubber within the range from about 10.4 to about 14.2 percent, based upon the weight of the hypochlorinated rubber and the chlorinated rubber.

LESTER A. BROOKS.

References Cited in the file of this patent

UNITED STATES PATENTS

| Number | Name | Date |
| --- | --- | --- |
| 2,170,947 | Habgood et al. | Aug. 29, 1939 |
| 2,182,456 | Stevenson | Dec. 5, 1939 |
| 2,191,748 | Baxter et al. | Feb. 27, 1940 |
| 2,522,137 | Schaffer | Sept. 12, 1950 |

FOREIGN PATENTS

| Number | Country | Date |
| --- | --- | --- |
| 476,743 | Great Britain | Dec. 15, 1937 |
| 492,767 | Great Britain | Sept. 27, 1938 |
| 499,550 | Great Britain | Jan. 25, 1939 |